April 13, 1965 P. S. PRICE ETAL 3,177,516
TILTED AXLE CASTER
Filed May 25, 1961 4 Sheets-Sheet 1
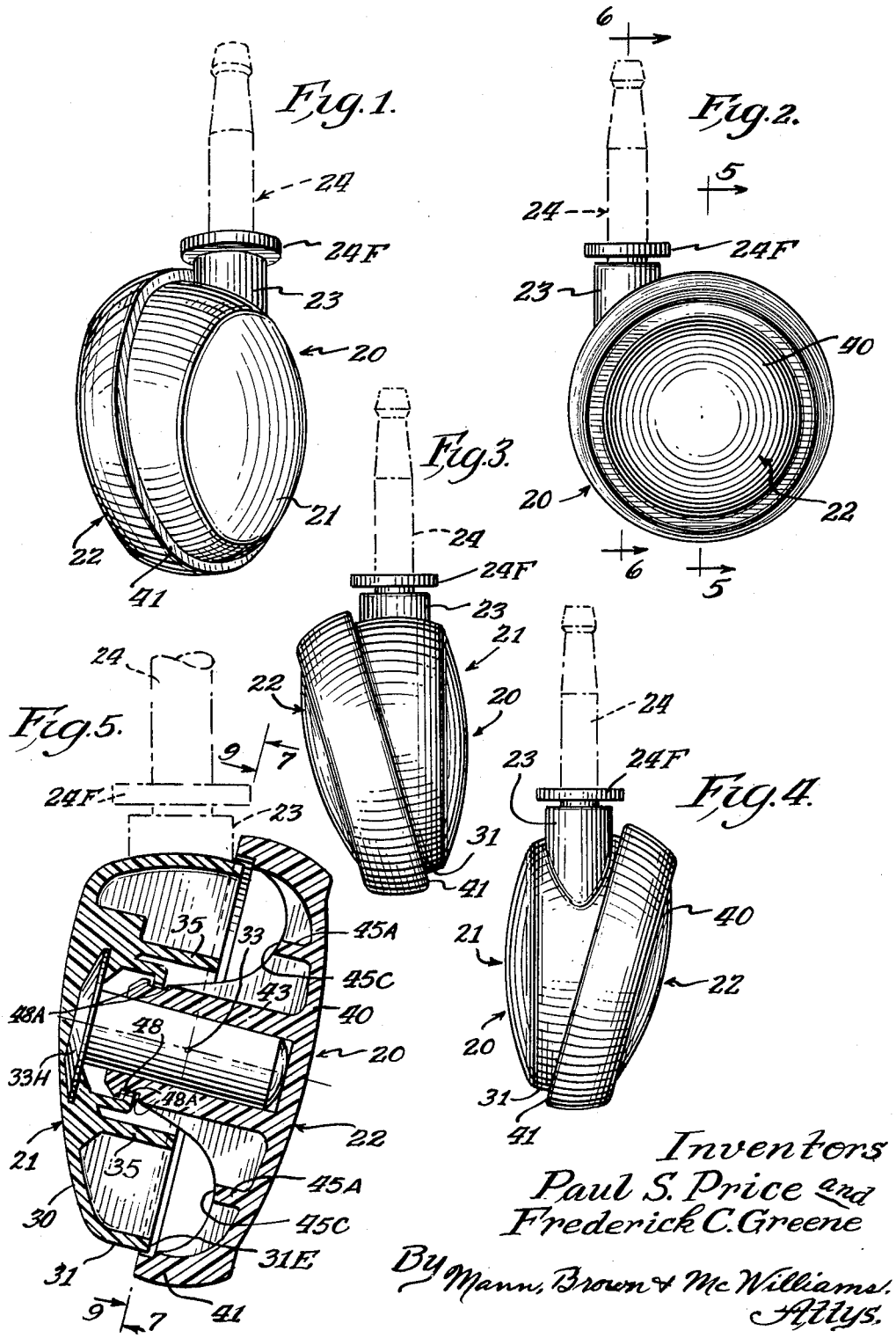
Inventors
Paul S. Price and
Frederick C. Greene
By Mann, Brown & McWilliams
Attys.

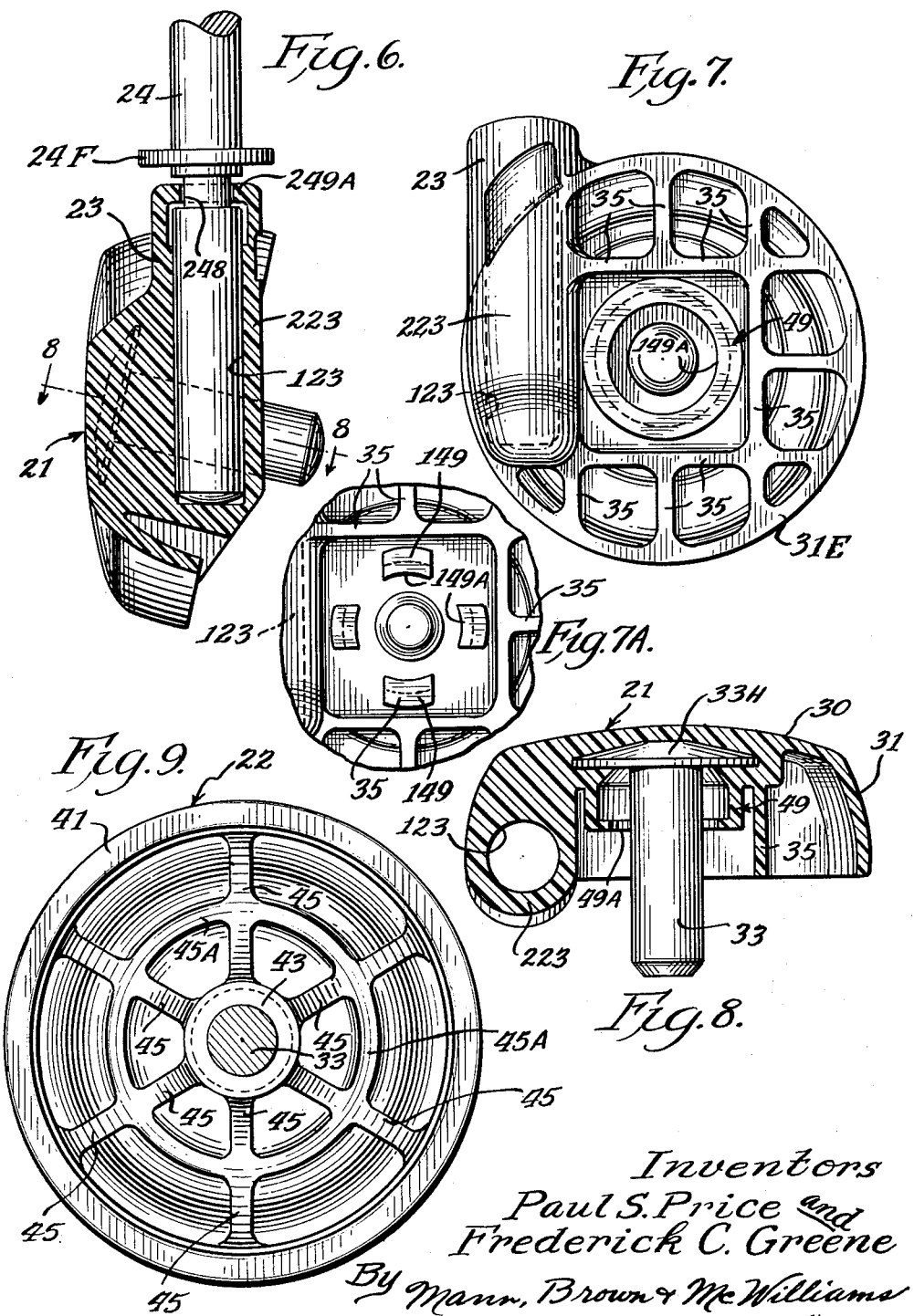

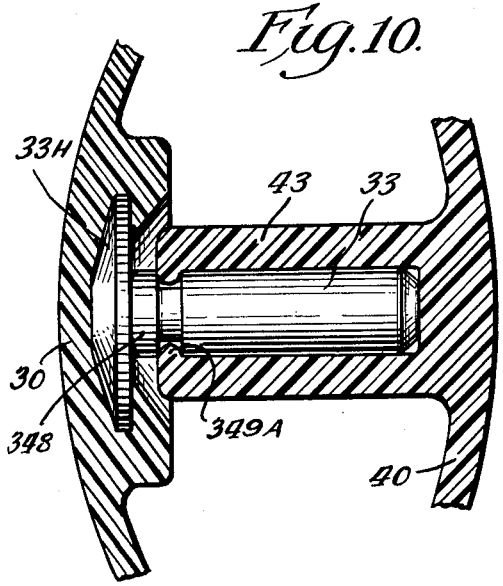
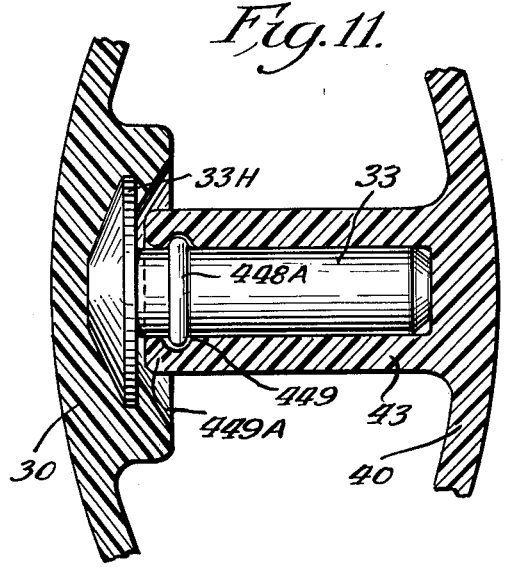
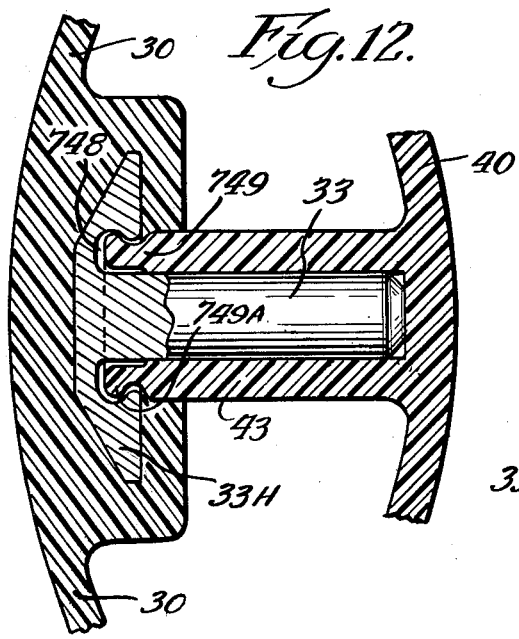
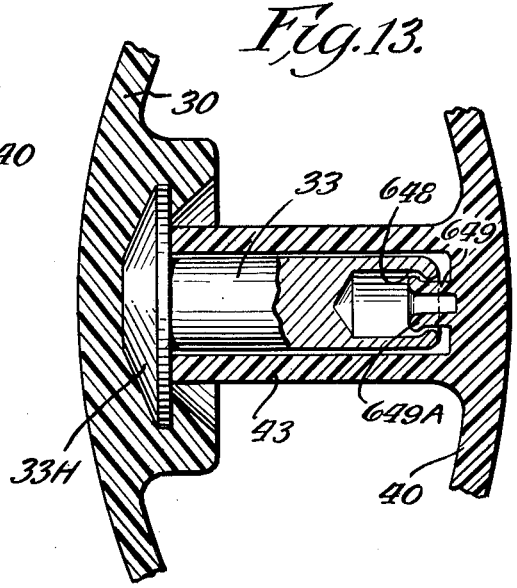
Inventors
Paul S. Price and
Frederick S. Greene
By Mann, Brown & McWilliams,
Attys.

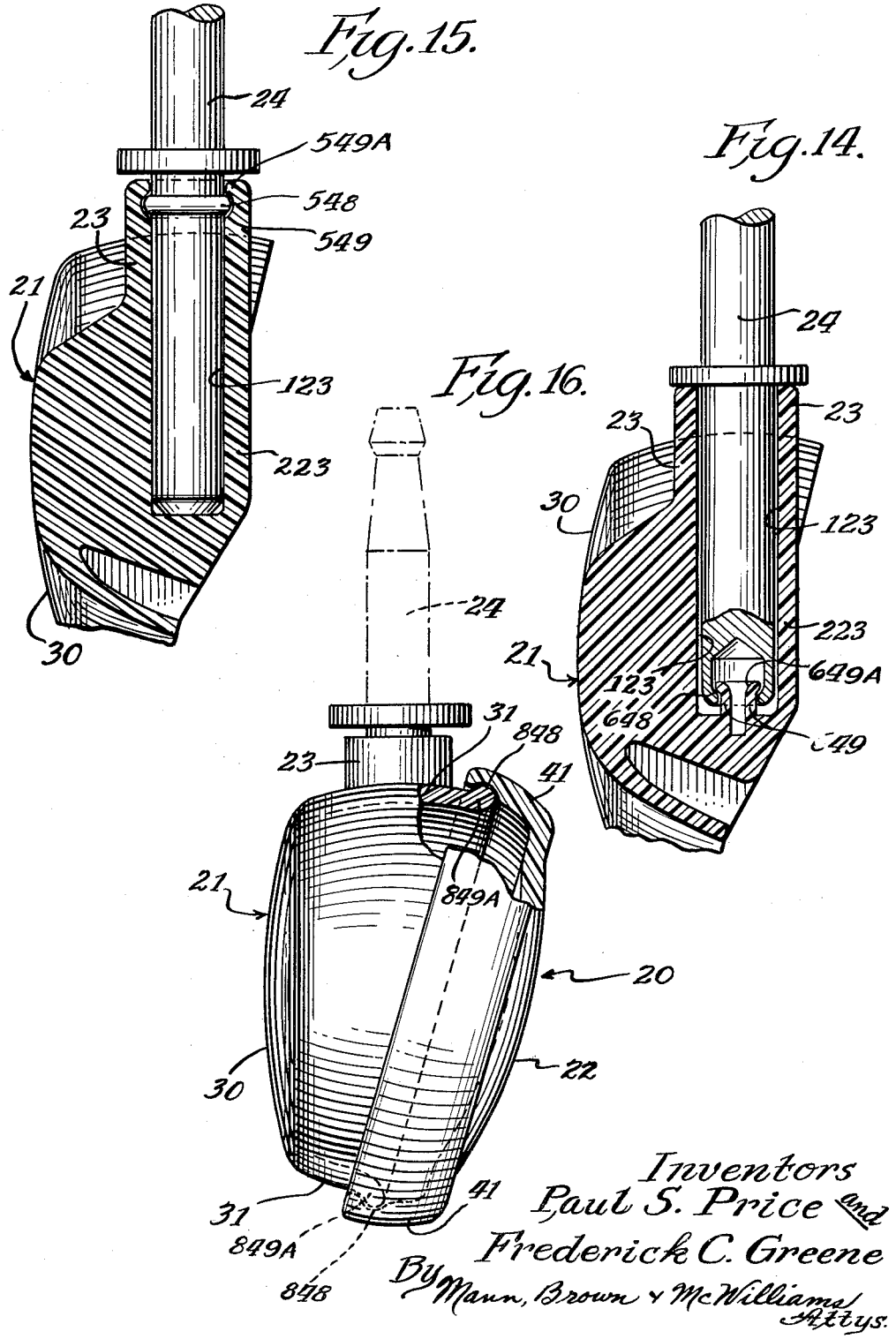

United States Patent Office 3,177,516
Patented Apr. 13, 1965

3,177,516
TILTED AXLE CASTER
Paul S. Price and Frederick C. Greene, St. Joseph, Mich., assignors to Shepherd Casters, Inc., a corporation of Michigan
Filed May 25, 1961, Ser. No. 112,560
2 Claims. (Cl. 16—18)

This invention relates to casters and particularly to tilted axle casters of the fully enclosed type. Fully enclosed axle casters have heretofore been made and sold, but in most instances of which we are aware, these casters have been made in a fully spherical form so as to be relatively large, and because of this, excessive material has been required, and the forces acting between the caster wheel and the swivel body of the caster have been applied in such a manner as to require excessive material and strength in the caster assembly.

In view of the foregoing, it is the primary object of the present invention to enable fully enclosed tilted axle casters to be made in such a way that the forces acting between the caster wheel and the swivel body of the caster are materially reduced, thus to enable the parts of the caster to be made more economically.

Another and related object is to reduce the bulk of casters of the aforesaid type to thereby reduce the material required in manufacture, and minimize the space required in storage and shipment.

More specifically it is an object of this invention to provide a caster of the aforesaid character wherein the disruptive moments acting on or between the parts are reduced to such a magnitude that the major parts may be made from economical materials, and a related object is to enable casters of the aforesaid character to be made primarily from molded thermoplastic. In casters of the aforesaid character it has been practice to provide relatively complicated means for holding the parts in assembled relationship, and it is a further object to simplify the manufacture, construction and assembly of such casters through the provision of simplified releasable fastening means for holding the parts together. More specifically, it is an object of this invention to enable the major parts of such a caster to be held releasably in their assembled relationship by interengagement of the retaining means that are formed integrally with the parts that are to be held together.

Other and further objects of the present invention will be apparent from the following description and claims, and are illustrated in the accompanying drawings, which, by way of illustration, show preferred embodiments of the present invention and the principles thereof, and what is now considered to be the best mode in which to apply these principles. Other embodiments of the invention embodying the same or equivalent principles may be used and structural changes may be made as desired by those skilled in the art without departing from the invention.

In the drawings:

FIG. 1 is a perspective view of a caster embodying the features of the invention;

FIG. 2 is a side elevational view of the caster;

FIGS. 3 and 4 are end elevational views of the caster as taken from opposite ends thereof;

FIG. 5 is a vertical sectional view taken substantially along the line 5—5 of FIG. 2;

FIG. 6 is a vertical sectional view taken substantially along the line 6—6 of FIG. 2;

FIG. 7 is a view looking into the open side of the main swivel body of the caster, the view being taken along the line 7—7 of FIG. 5;

FIG. 7A is a somewhat schematic view somewhat similar to FIG. 7 and showing a slightly modified form of retaining means;

FIG. 8 is a plan cross sectional view taken substantially along the line 8—8 of FIG. 6;

FIG. 9 is a view looking into the open face of the caster wheel, the view being taken substantially along the line 9—9 of FIG. 5;

FIG. 10 is a fragmentary cross sectional view similar to a portion of FIG. 5 and illustrating another form of retaining means;

FIG. 11 is a view similar to FIG. 10 and showing another way in which the retaining means may be embodied;

FIG. 12 is a view similar to FIG. 10 and showing another form of retaining means for holding the caster wheel in place;

FIG. 13 is a view similar to FIG. 10 and showing another alternative embodiment of the retaining means;

FIG. 14 is a view similar to FIG. 12 and showing a retaining means for the vertical pivot, such retaining means being similar to that shown in FIG. 13;

FIG. 15 is a vertical sectional view similar to a portion of FIG. 6 and showing retaining means for the vertical pivot; and FIG. 16 is a fragmentary vertical sectional view showing still another form of retaining means for holding the caster wheel in place.

For purposes of disclosure the invention is illustrated as embodied in a caster 20 of the tilted axle type having a main swivel body 21 on which is mounted a caster wheel 22, and the main caster body 21 has means including an upwardly projecting hub 23 to define an upwardly opening vertical socket 123 for receiving a pivot or swivel shaft 24, the axis of the socket 123 being offset substantially as shown in FIG. 2 from the rotative or central axis of the caster wheel 22 to provide for a pronounced castering action about the pivot shaft 24. The caster 20 is of the fully enclosed type in that the bearing structures that associate the caster wheel 22 with the main swivel body 21 are enclosed and concealed in the space between the caster wheel 22 and the main swivel body 21.

In accordance with the present invention this fully enclosed relationship is attained in such a way that the cooperating bearing members which support the body 21 on the wheel 22 are relatively short, thereby to reduce the disruptive moments acting between the bearing members and the members 21 and 22. By reason of this construction and arrangement, the strength required in the metal or other material from which the swivel body 21 is made is materially reduced so that the amount of material used in these parts may be reduced, or alternatively, the parts may be primarily made from less expensive material such as plastic.

The caster of this invention may be made by casting or molding from metal or by injection molding of plastic; the embodiment herein illustrated is shown as being made from a plastic material. This plastic material must have a high strength, high resistance to shattering, and must resist deformation under load. A plastic that meets such requirements is the product made and sold by E. I. du Pont de Nemours & Co., of Wilmington, Delaware, under the trademark Delrin. Such material being made by the aforesaid company in several different compositions, only certain of which are intended and adapted for injection molding. Thus we prefer to use the composition identified as Delrin 500, or Delrin 507, and it is noted that both of these compositions have a surface lubricating characteristic which is particularly useful in the bearing structures of the caster.

Thus, as shown particularly in FIGS. 5 to 9, both the swivel body 21 and the caster wheel 22 are of a modified cup-shaped form so that they fit together with the open faces or rims of these members directly adjacent to each other, and this provides the internal space within which the bearing structures for the caster wheel are housed.

Thus, with particular relation to the main body 21, the cup-shaped form thereof provides for a vertical cross wall 30 which has an annular wall 31 extended therefrom. The cross wall 30 is substantially flat, but for the sake of design or appearance is shown as having a slight outward convexity. This annular wall 31 is of varying width so that it is relatively narrow at its lower side and relatively wide at its upper side, and as a result the wall 31 terminates in an annular edge 31E that is disposed at an angle to the vertical edge as will be particularly apparent in FIG. 5. Within the swivel member 21, an axle 33 is mounted which has a relatively large anchoring head 33H which in the course of molding of the body member 21 is embedded in the wall 30 so that it is perpendicular to the plane of the annular edge 31E and is centered with respect to this edge.

Near one edge of the body 21, wall means 223 are provided which constitute a downward continuation of the projecting hub 23 and such means are formed primarily within the cut-shaped member 21, but at the lower end thereof project outwardly beyond the plane of the edge 31E, as will be evident in FIG. 6. The wall means 223 define the socket 123 so that it is closed at its lower end and into which the lower portion of the pivot structure 24 extends so as to bear upon the lower or closed end of the socket 123. It will be recognized that it is the portion of the pivot shaft 24 that is within the socket 123 which provides for the swivelling movement of the caster, and that portion of the pin 24 that is above the hub 23 may take many different forms as is well known in the art.

The wall means 223 that form the socket 123 form part of the internal bracing or strengthening means of the body 21. Thus, as will be evident in FIGS. 5, 7 and 8, a plurality of internal walls 35 extend in a generally grid-like arrangement between the socket walls 223 and the side wall 31, and these walls 35 terminate in the plane of the annular edge 31E and are integral at their other edges with the vertical wall 30.

The caster wheel 22 as hereinbefore mentioned is also of generally cup-shaped form and has a circular and substantially flat cross wall 40 about the outer edge of which an annular wall 41 of uniform width and cross section is formed. The cross wall 40, although substantially flat in a structural sense, has a slight outward convexity to enhance the appearance of the caster. The radius of the annular wall 41 is such that it fits to a slight extent over and embraces the portions of the wall 31 adjacent the annular edge 31E. The wall 41 serves as a tread for the caster wheel 22. Within the caster wheel 22, a bearing sleeve 43 is formed integrally with and centered on the wall 40 so that the sleeve 43 is coaxial with respect to the annular tread or wall 41, and this sleeve 43 constitutes a bearing sleeve that may be slipped over the bearing pin 33 into the general relationship shown in FIG. 5, and it is in this position that the caster wheel 22 may turn and serve as a rolling support. In the form shown in FIG. 5, the axial or thrust forces between the bearing pin 33 and the caster wheel are exerted between the end of the bearing pin 33 and the bottom of the socket that is formed by the bearing sleeve 43. The sleeve 43 and the walls 41 of the caster wheel 22 are interconnected or braced by a series of integral radial webs or walls 45 that join integrally with the wall 40, the tread 41 and the bearing sleeve 43, as will be evident in FIGS. 5 and 9. An annular bracing wall 45 that is integral with the wall 40 extends between and is integral with the walls 45. The bracing walls 45 have their free edges formed in an arcuate shape, as indicated at 45C, so as to clear the lower end of the socket structure when the caster wheel 22 is rotated.

When the caster 20 is in its position of use and is under load, the caster wheel 22, the swivel body 21 and the vertical pivot 24 are held in the proper assembled relation by forces involved in supporting the load, but at other times, as during assembly, shipping and installation, or when the structure being supported by the caster 20 is lifted, the parts of the caster may tend to come apart. Retaining means are therefore provided acting releasable between the three major parts of the caster 20, and in providing such means under the present invention it has been kept in mind that the forces tending to produce disassembly of the parts are relatively slight, so that the retaining means under this invention are relatively simple and may be provided in an economical manner.

The retaining means, as to each pair of relatively rotatable parts, basically comprise an annular abutment shoulder on one part of each pair, and a resilient member on the other part of the pair arranged to bend slightly in a radial sense as the pair of parts are moved endwise into assembled relation, and then to return in a radial sense to a position where the resilient member may engage the annular shoulder to prevent undesired endwise disassembly of the pair of parts. The cooperating elements of such retaining means may take different forms, as will be described, and may be integrally formed with the rotating parts of each pair so as to simplify the production of the caster.

Thus, as shown in FIGS. 5, 7 and 8, the outer surfaces of the bearing sleeve 43 has an annular groove 48 formed therein near its end so as to provide an annular abutment face 48A facing toward the wall 40, and the wall 30 of the swivel member 21 has an annular and relatively thin retaining wall 49 concentric with the axle 33 and of L-shaped cross section to provide an inwardly projecting annular retaining lip 49A. The retaining element or wall 49 is formed integrally with the wall 30. The thinness of the wall 49 and the lip 49A render these parts resilient to the extent necessary in assembly or disassembly of the parts. Thus, the opening through the retaining lip 49A is slightly smaller than the outer diameter of the bearing sleeve 43, and the end portion of the sleeve 43 is slightly tapered so that when the sleeve 43 is forced endwise onto the axle 33, the opening is expanded until the annular groove 48 moves into position opposite the lip 49A, and at this time the lip contracts and enters the groove 48A. The lip 49A will then engage the abutment 48A to prevent disassembly, but in normal operation, when the thrust of a load is being taken between the wall 40 and the end of the axle 33, the lip 49A is centered in and does not engage the sides of the groove 48. Further, the lip 49A does not engage the bottom of the groove 48.

The annular characteristic of the wall 49 and the lip 49A is not essential, since these elements may take the form shown in FIG. 7A where the retaining means 49–49A are discontinuous and take the form of a plurality of fingers 149 and lips 149A arranged in an annular series so as to have the same general action as the wall 49 and the lip 49A.

In FIG. 6, one form of retaining means are shown for the vertical pivot 24. This means comprises a groove 248 in the pivot 24 at about the upper end of the hub 23. The hub 23 has an inturned flange 249A at the upper end to enter the groove 248 and function the same as the lip 49A.

In the form shown in FIG. 10, the axle 33 has an annular groove 348 formed therein at a location where an inturned lip 349A formed integrally on the end of the bearing sleeve 43 may snap into the groove 348 to attain the desired retaining action without rubbing of the parts.

In FIG. 11 the axle 33 has an upset annular flange 448A thereon near the base of the axle, and the bearing sleeve 43 has an internal annular groove 449 to engage the annular shoulder provided by the flange 448A to hold the parts together. Here again, the parts run free and without rubbing when the caster is under load.

A similar retaining means for the pivot pin is shown in FIG. 15 where an upset angular flange 548 on the pin 24 is embraced by a groove and lip structure 549–549A formed integrally at the upper end of the hub 23.

In FIG. 13, the end thrust between the sleeve and axle is taken by engagement of the end of the bearing sleeve 43 with the head 33H of the axle, and in this instance the end of the axle 33 has an undercut axial bore or opening 648 in its end providing an annular shoulder. Within and at the bottom of the sleeve 43, a coaxial tubular wall 649 is provided with an outturned flange 649A. In the assembly of the elements, the flange 649A is compressed as it passes into the undercut bore 648, and then expands so as to hold the parts releasably in assembled relation.

FIG. 14 shows the retaining structure of FIG. 13 as applied to the vertical pivot 24. In this instance the thrust is taken by bearing of the upper end of the hub 23 against a flange 24P on the pivot 24, and this spaces the lower end of the pivot 24 from the bottom of the socket 123 so that the retaining structure of FIG. 13 may be applied.

FIG. 12 shows a retaining structure where an undercut annular groove 748 is provided in the exposed face of the head 33H of the axle 33. The end of the bearing sleeve 43 in this instance has a thin wall 749 extending from its end with an out-turned flange 749A. This wall 749 and flange 749A are similar to the wall 649 and flange 649A of FIG. 13, and enter the groove 748 under inward compression and then expand to provide the desired holding or retaining action.

In FIG. 16, the wall 41 has an internal groove 848 formed therein near its edge, while the wall 31 has an outturned flange 849A along its edge, and these parts may be pressed together to a relationship where the parts engage as shown in FIG. 16 to hold the parts releasably in assembled relation. In all of the several retaining means, the parts are arranged to have clearance so as to run free when under load.

From the foregoing description it will be apparent that the present invention enables a fully enclosed tilted axle caster to be constructed in a compact attractive and economical form, and that in accordance with this invention the disruptive moment acting between the body and wheel of the caster are materially reduced and are applied in such a way that the strength requirement in the caster parts are minimized.

It will also be apparent from the foregoing description that the present invention simplifies the manufacture and assembly of tilted axle casters through the provision of novel retaining means for holding the caster parts in assembled relation.

It will also be apparent that the form and construction of the caster of this invention enables the major parts of the caster to be provided by injection molding of the plastic material.

Thus, while preferred embodiments of the invention have been illustrated herein, it is to be understood that changes and variations may be made by those skilled in the art without departing from the spirit and scope of the appending claims.

We claim:

1. In a caster of tilted axle type, a generally hollow unitary swivel body member molded to a modified thin walled cup-shaped form of substantially greater height than width and characterized by a circular substantially disc-like vertical cross wall merging with an annular side wall extending from the periphery of said circular vertical wall and terminating in an annular edge defining an open face in a tilted plane disposed at an angle to the vertical wall such that the overall horizontal width dimension of the cup-shaped form varies progressively from a maximum width at the upper extremity of the vertical wall to a minimum width at the lower extremity of the vertical wall, said body member having integral wall means located primarily within a laterally off-center region of said hollow swivel body and extending vertically more than one half the height of said body member to terminate in a lower portion that projects through an eccentric region of the meeting plane and extending at its upper end beyond and outside of said annular side wall to define an upwardly opening generally cylindrical vertical swivel socket, said swivel body member having integral ribs internally along its cross wall and extending between said side wall and the socket defining integral wall means, a unitary caster wheel member disposed over and in opposed closing generally parallel relation to the open face of said swivel body member and of generally symmetrical thin walled cup-shaped form of substantially greater height than width and characterized by a substantially disc-like circular cross wall merging with a side wall of uniform width and constituting a tread for the caster wheel member, the last-named side wall defining a planar open face parallel to the last named cross wall, said wheel member having integral radial ribs internally along its cross wall and merging with said side wall, said radial ribs being recessed from the last named open face to provide an annular clearance pocket for the lower portion of said socket defining integral wall means, an axle element and an embracing bearing sleeve element disposed within and between the swivel body member and wheel member each to extend concentrically and perpendicularly to said open faces, said axle element having one end fixedly retained by a molded insert in the cross wall of one of said members and said bearing sleeve element having one end integrally merging with the cross wall and ribs of the other of said members.

2. In a caster of tilted axle type, a generally hollow unitary swivel body member molded to a modified thin walled cup-shaped form of substantially greater height than width and characterized by a circular substantially disc-like vertical cross wall merging with an annular side wall extending from the periphery of said circular vertical wall and terminating in an annular edge defining an open face in a tilted plane disposed at an angle to the vertical wall such that the overall horizontal width dimension of the cup-shaped form varies progressively from a maximum width at the upper extremity of the vertical wall to a minimum width at the lower extremity of the vertical wall, said body member having integral wall means located primarily within a laterally off-center region of said hollow swivel body and extending vertically more than one half the height of said body member to terminate in a lower portion that projects through an eccentric region of the meeting plane and extending at its upper end beyond and outside of said annular side wall to define an upwardly opening generally cylindrical vertical swivel socket, said swivel body member having integral ribs internally along its cross wall and extending between said side wall and the socket defining integral wall means, a unitary caster wheel member disposed over and in opposed closing generally parallel relation to the open face of said swivel body member and of generally symmetrical thin walled cup-shaped form of substantially greater height than width and characterized by a substantially disc-like circular cross wall merging with a side wall of uniform width and constituting a tread for the caster wheel member, the last named side wall defining a planar open face parallel to the last named cross wall, said wheel member having integral radial ribs internally along its cross wall and merging with said side wall, said radial ribs being recessed from the last named open face to provide an annular clearance pocket for the lower portion of said socket defining integral wall means, an axle element and an embracing bearing sleeve element disposed within and between the swivel body member and wheel member each to extend concentrically and perpendicularly to said open faces, said axle element being rigid at one of its ends with a first one of said members and said bearing sleeve element being formed integrally at one end with the other of said members, and cooperating abutment means concentric with said elements for holding the members in assembled relation comprising an annular abutment on one of said elements and a resilient abutment formed integrally on another of said elements in position to engage said annular abutment.

References Cited by the Examiner

UNITED STATES PATENTS

| | | | |
|---|---|---|---|
| 1,929,743 | 10/33 | Jarvis et al. | 16—43 |
| 2,096,239 | 10/37 | Geyer | 16—46 |

FOREIGN PATENTS

| | | |
|---|---|---|
| 136,548 | 3/50 | Australia. |
| 278,881 | 2/52 | Switzerland. |

DONLEY J. STOCKING, *Primary Examiner.*

JOSEPH D. SEERS, *Examiner.*